June 11, 1940.    J. L. ANDERSON    2,203,855
APPARATUS AND METHOD OF FORMING AND WELDING TUBES
Filed July 28, 1937    3 Sheets-Sheet 1
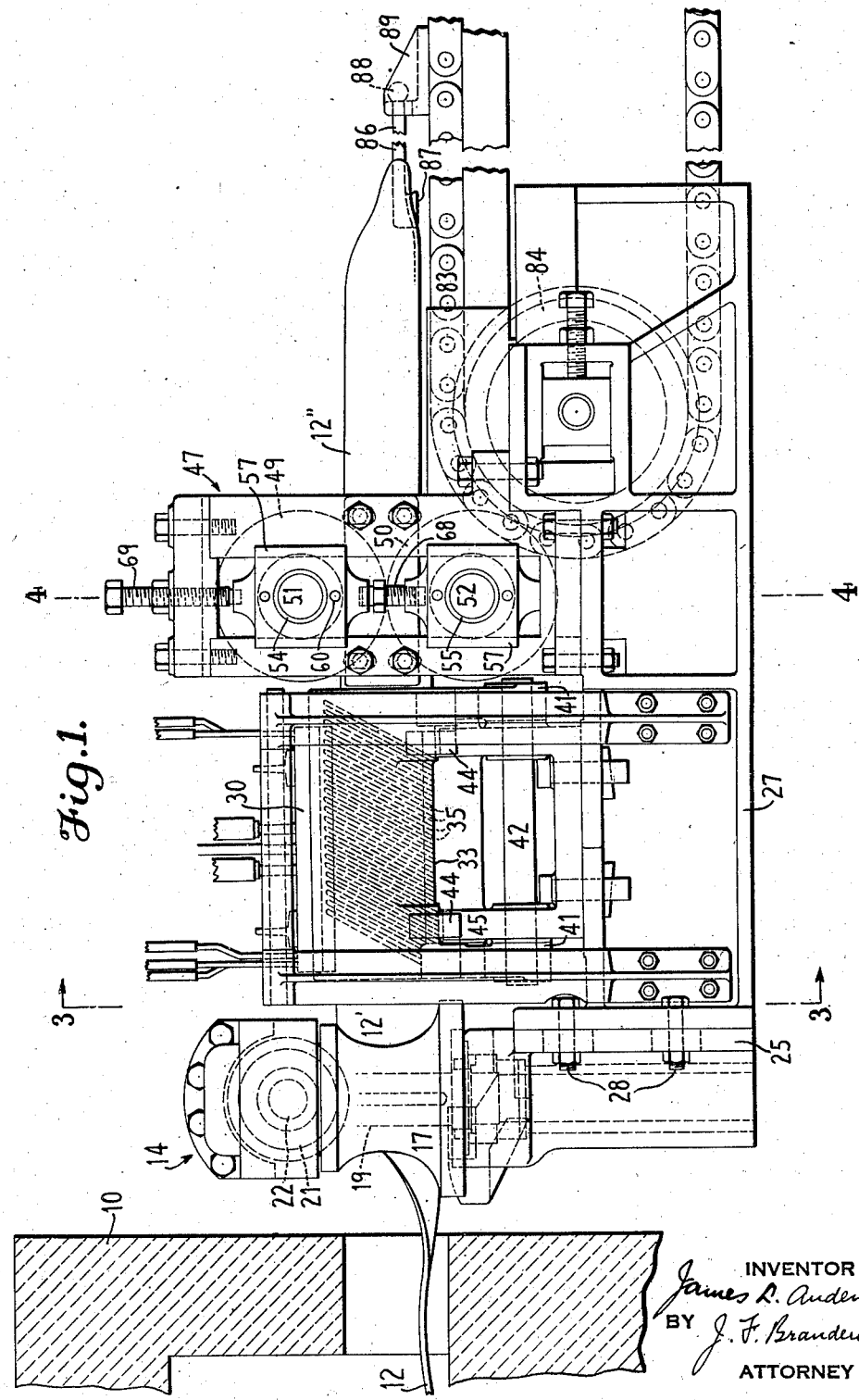

June 11, 1940.   J. L. ANDERSON   2,203,855
APPARATUS AND METHOD OF FORMING AND WELDING TUBES
Filed July 28, 1937   3 Sheets-Sheet 2

INVENTOR
James L. Anderson
BY J. F. Brandenburg
ATTORNEY

June 11, 1940.   J. L. ANDERSON   2,203,855
APPARATUS AND METHOD OF FORMING AND WELDING TUBES
Filed July 28, 1937   3 Sheets-Sheet 3
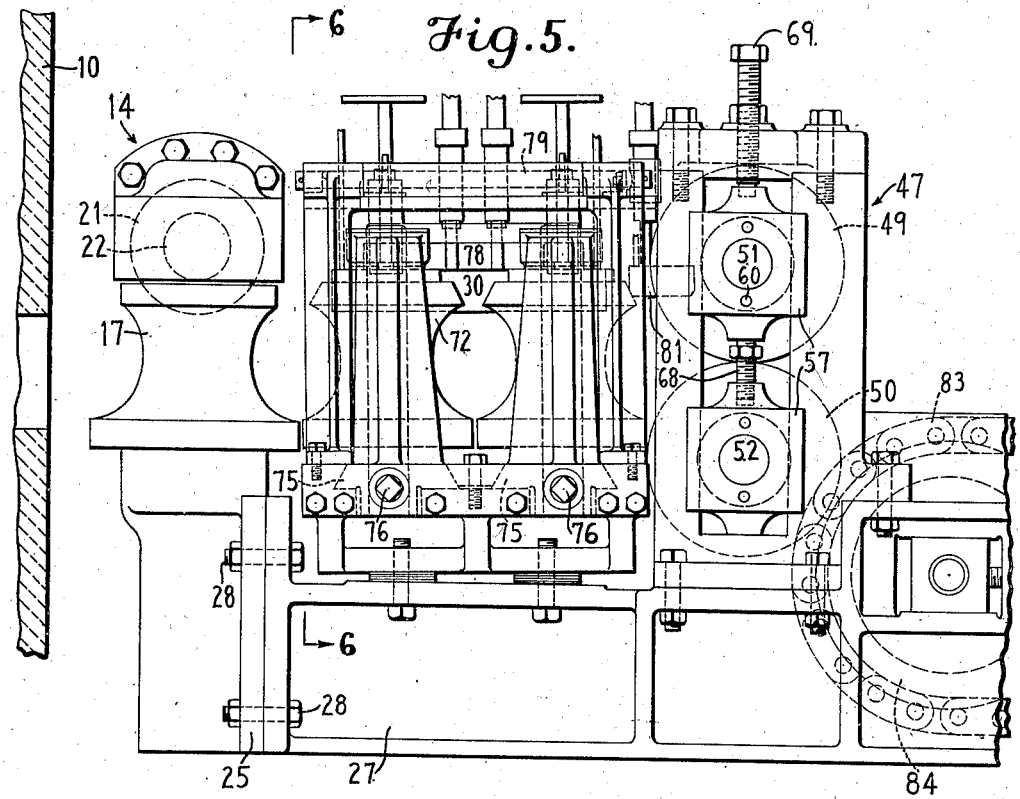
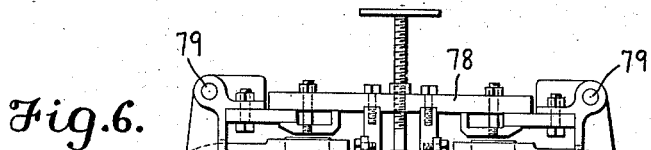
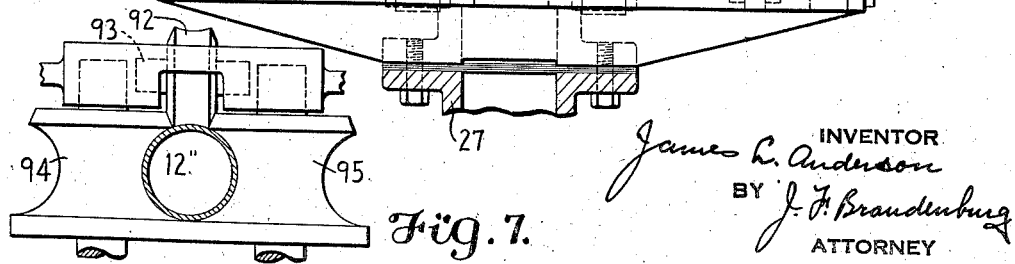
INVENTOR
James L. Anderson
BY J. F. Brandenburg
ATTORNEY

UNITED STATES PATENT OFFICE 2,203,855

APPARATUS AND METHOD OF FORMING AND WELDING TUBES

James L. Anderson, Closter, N. J., assignor to Air Reduction Company, Incorporated, New York, N. Y., a corporation of New York Application July 28, 1937, Serial No. 156,116

5 Claims. (Cl. 78—83)

In the manufacture of welded pipe and tubing by pulling skelp from a heating furnace and through apparatus which bends the skelp to tubular form and brings the seam edges together to make the weld, it is advantageous to use roll passes for forming the tube and moving the seam edges into contact. Rolls have not been used generally, however, because of the difficulty of manipulating the tongs or other skelp-pulling tool through forming and welding apparatus using rolls. Tongs which open in scissors-fashion can not be opened to grip a skelp when they are inserted through a closed roll pass. With apparatus having forming rolls and using such tongs it is necessary for the rolls to move apart to permit the tongs to be inserted into the pass transversely after they have been operated to grip the skelp.

Even with a skelp-pulling tool comprising a long rod with a hook at one end for engaging the skelp, as disclosed in my copending application Serial No. 91,212, filed July 17, 1936, it is difficult to manipulate a long rod to hook the skelp unless the roll passes furthest from the furnace are designed to open.

In accordance with one feature of this invention the forming and welding is done in such a manner that the distance required to bend the skelp into a tube blank, heat the seam edges to a welding condition, and bring the edges together to make the weld is very short, and by locating the apparatus close to the heating furnace, and placing the draw-bench or other pulling device close behind the forming and welding apparatus, a short pulling tool can be used and there are no roll passes far enough from the furnace to unduly limit the angular movement of the tool, even though none of the roll passes can be opened.

It may be said, therefore, that one object of the invention is to provide improved method and apparatus for making welded pipe or tubing from furnace-heated skelp.

Other aspects of the invention relate to improvements in the forming and welding of pipes and tubes with or without furnace heat.

It is an object of the invention to provide method and apparatus for producing smoother and stronger welds. These ends are attained by rolling the outside surface of the weld at the same point where the seam-closing force is applied to the tube blank immediately behind a region of intense heating of the edge portions of the tube blank, and by subjecting the most highly heated region of the tube to a disproportionate working in the final forming step where the edges are brought together.

One feature of the invention relates to the heating of the edges of a tube blank, which heating may be done by carbon arcs, flame jets such as oxyacetylene flames, or other heat agencies. According to this invention the heat is applied directly to the edge faces not only while the tube blank is approaching and leaving a roll pass, but while it is passing through the roll pass as well.

Other objects, features and advantages of the invention will appear or be pointed out as the specification proceeds.

In the accompanying drawings, forming part hereof:

Fig. 1 is a side elevation of apparatus for making pipe in accordance with this invention;

Fig. 5 is a side elevation showing a modification of the invention;

Fig. 6 is a sectional view taken on the line 6—6 of Fig. 5, but with a tube blank shown passing through the roll pass;

Fig. 7 is a fragmentary detail view showing another modified form of the invention.

Figure 4:
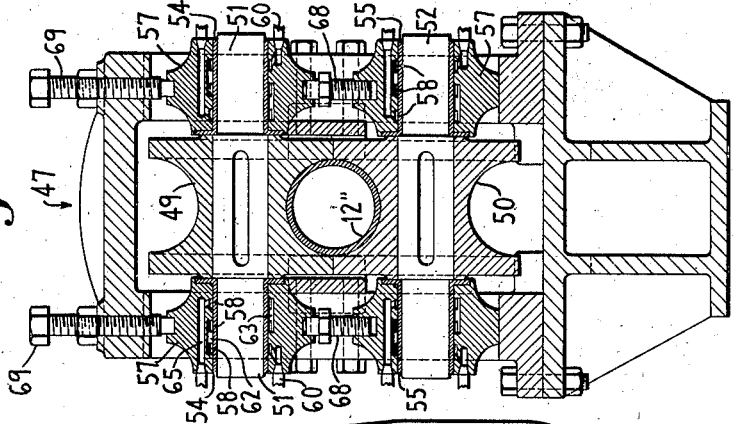
Fig. 4 is a sectional view taken on the line 4—4 of Fig. 1.

Lengths of skelp, preferably flat, are preheated in a furnace 10 to a temperature substantially less than the melting point of the metal. The flat skelp is indicated by the reference character 12, and that part of the strip which has been formed into a tube blank by the reference character 12'. The welded tube is designated 12''.

The flat skelp 12 is formed into a tube blank 12' in one roll stand 14. The expression "tube blank" as used in this specification denotes a length of skelp which has been bent to the general contour of a tube but has an open seam and at least a portion of its circumferential extent with a radius of curvature longer than the radius of the final tube.

Figure 2:
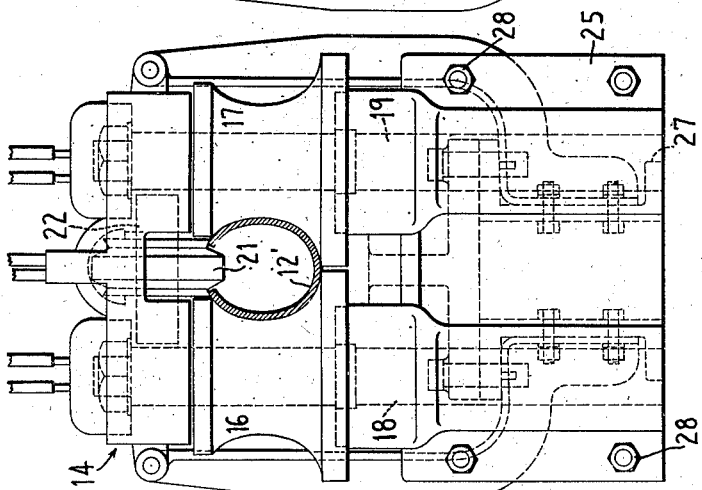
Fig. 2 is a front view of the forming and welding equipment shown in Fig. 1.

The roll stand 14 includes two rolls 16 and 17 on vertically extending shafts 18 and 19, and a single guide roll 21 (best shown in Fig. 2) supported on a horizontal axle 22 and extending between the upper edges of the rolls 16 and 17. The guide roll 21 has a raised midportion which extends between the edges of the tube blank and serves as a guide for maintaining the tube blank in position with the seam at the top.

The roll stand 14 forms the tube blank 12' with a substantially oval contour, the seam being located at one end of the oval where the radius of curvature is shortest. This is an advantageous shape for the tube blank because it makes possible better control of the working imparted to the metal when the seam edges are brought together and the tube blank bent to circular contour in the welding roll pass.

The shafts 18 and 19 have bearings in a frame 26. The bearings are water cooled. The frame 26 is attached to a main frame 27 (Fig. 1) by bolts 28 which extend through slots in the frame and thereby permit a limited vertical adjustment of the forming roll stand 14.

Immediately beyond the forming stand 14, the tube blank 12' passes under a system of flame or other heating agency. The drawing shows a torch 30 which has jet orifices in position to project flame jets 31 (Fig. 3) directly against the edge faces of the tube blank. I prefer to use oxyacetylene flames because of their intense heat and the reducing envelope gases which accompany such flames.

While being heated, the tube blank passes through a retort comprising left and right hand retort blocks 32 and 33. The confronting faces of the retort blocks are curved to substantially the same contour as the outside surface of the tube blank and these faces serve as guide surfaces for confining the envelope gases of the flame jets close to the surface of the tube blank as these gases flow downward from the edges toward the midportion of the tube blank. Sloping grooves 35 in the confronting faces of the retort blocks increase their effectiveness as guides for the envelope gases.

Figure 3:
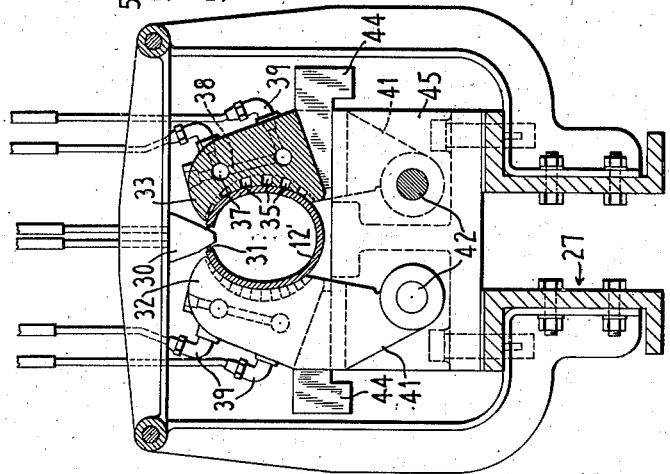
Fig. 3 is an end view of the retorts with the right-hand retort shown in section along the line 3—3 of Fig. 1.

The retort block 33 is shown in section in Fig. 3. Longitudinally extending cooling chambers 37 are connected at their forward end by a passage 38 and at their rearward ends communicate through elbows 39 with hose or tubing by which cooling fluid, preferably water, flows to and from the retort block. Either of the elbows 39 may be made the inlet connection and the other the exhaust connection for the cooling medium.

Arms 41 extend down from the ends of the retort block 33 and are journaled at their lower ends on a shaft 42 supported by the frame 27 of the machine. The arms 41 can be turned about the shaft 42 to move the retort block 33 away from the tube blank and away from the other retort block to expose the face of the torch and the guide face of the retort block when they are to be cleaned.

The retort block 33 is held in the desired position by wedges 44 which fit between the under side of the block 33 and a member 45 of the main frame 27. The construction of the retort block 32 is similar to that of the retort block 33 with what reversals are necessary because of the fact that one is located on the right-hand side of the tube blank and the other on the left.

Immediately beyond the torch 30 and the retort formed by the blocks 32 and 33, the tube blank enters a welding roll stand 47 which is secured to the main frame 27 and includes upper and lower welding rolls 49 and 50, respectively. These rolls have horizontal axles 51 and 52, best shown in Fig. 4, and the axles turn in bearings 54 and 55. The welding rolls not only bring the seam edges together, but the upper roll 49 rolls the weld at the point where the closing force is applied and where the pressure between the edge faces is of maximum intensity.

The bearings 54 and 55 are held in bearing blocks 57, each of which has passages 58 directly behind the bearing 54. Fig. 4 shows three passages 58 that extend completely around the bearing 54. Cooling fluid, such as water, enters the bearing block 57 through an inlet passage 60 which communicates with the outer one of the passages 58 at its lowest point. There is a duct 62 at the top of the bearing connecting the outer one of the passages 58 with the middle passage. This middle passage is in communication with the inner passage 58 through a duct 63 under the bearing 54. Cooling medium exhausts from the inner passage 58 through a conduit 65 which extends through the bearing block 57 and opens into the inner passage 58 at the top of the bearing.

The cooling fluid, therefore, flows through a tortuous chamber and is in contact with the actual metal of the bearing. With this construction the bearings are not only cooled more effectively than with less direct methods, but the stresses set up by expansions and contractions are substantially reduced.

The bearing blocks 57 slide in vertical guideways in the frame of the roll stand 47. The lower bearing blocks rest on the frame of the machine. There are screws 68 between the lower and upper bearing blocks. Cap screws 69 thread through the top of the frame and bear against the top sides of the upper bearing blocks 57.

Figs. 5 and 6 show a modified form of the invention in which there is no retort, and the tube blank passes between two sets of gathering or guide rolls, each set including rolls 71 and 72 in the relation shown in Fig. 6. These gathering rolls contact with the tube blank 12' around most of its circumference, but the edges of the blank extend inward some distance beyond the rolls so that the faces of the edges can be heated more effectively and without danger of overheating the rolls.

The gathering rolls 71, 72 may be so shaped that when properly spaced they serve as guides for holding the tube blank to substantially the same contour with which it left the first roll pass 14, or they may be moved nearer together so that they bring the seam edges progressively closer as the edges travel toward the welding roll stand 47. The gathering rolls 71, 72 turn on vertical axles, each of which is carried by a gib 75 adjustable on the frame of the machine by a screw 76 to change the spacing of the gathering rolls and the resulting spacing of the seam edges.

The torch 30 is supported on a bracket 78 in Figs. 5 and 6, and this bracket is connected with the frame of the machine by a pivot connection 79 so that the torch can be swung up into an accessible position for cleaning.

An auxiliary torch 81, which does not extend between the seam edges, is located just beyond the second set of gathering or guide rolls to apply additional heat to the seam edges as they come together when entering the welding roll pass.

The tube blank is pulled through the roll passes by a drawbench, one end of which is shown in Figs. 1 and 5. The drawbench has a chain 83 driven by power mechanism, not shown. The chain passes around a pulley 84 located immediately beyond the welding roll stand 47.

A tool 86 (Fig. 1) having a hook 87 at one end and a head 88 at the other end is used to connect the end of the tube blank with the chain of the drawbench. The tool 86 is initially inserted through the roll passes and into the furnace 10 where the hook 87 is engaged with an opening or recess in the end of a skelp. The short length of the welding apparatus makes it possible for the attendant to obtain a reasonable amount of angular movement of the tool 86 when manipulating it to hook the skelp.

The hook 87 can be used to pull the skelp and tube blank without danger of the skelp breaking and the hook pulling loose because the heating of the skelp in the furnace is limited to a temperature sufficiently lower than the melting point of the metal so that the strength of the skelp is not substantially reduced.

When higher skelp temperatures are required, the position of the tapered and formed skelp end near the mouth of the furnace limits the heating of the end of the skelp so that the section engaged by the hook is at a lower temperature capable of withstanding the drawing and forming stresses. The edge faces are raised to a welding condition by local heating which leaves the body of the tube blank at a temperature substantially lower than the edge faces.

As soon as the tool 86 has been engaged with the skelp, the attendant lays the tool down over the chain of the drawbench where the head 88 is caught by the next dog 89 of the chain.

Fig. 7 shows a modified construction for the welding rolls. Instead of having both of the welding rolls on horizontal axes, as are the rolls 49 and 50 of Fig. 4, the desired welding and rolling of the metal can be obtained with a roll pass such as shown in Fig. 7. A roll 92 which contacts with the top of the tube 12'', has a horizontal axle 93, and forms with two other rolls 94, 95, a substantially circular roll pass. The axles of the rolls 94, 95 are substantially vertical. When the welding roll stand shown in Fig. 7 is used in place of the roll stand 47, a sizing roll stand similar in construction to the roll stand 47 may be used between the welding rolls and the drawbench.

It will be apparent that this invention is not limited to the particular embodiments which have been illustrated and described, and that features of the invention may be used without others.

I claim:

1. In the manufacture of pipe and tubing by forming preheated skelp into a tube blank, locally heating the seam edges of the formed blank to a welding condition by heating jets projected directly against the edge faces with the blank in continuous motion, and progressively bringing the seam edges together to make a weld immediately beyond the region of heating, the improvement which comprises forming the tube blank with a cross-section having a generally oval contour and converging but separated edge portions with the seam at one end of the oval, applying the heating jets to the separated faces of said edge portions, gathering the edge portions together by rolling pressure against the outside surface of the tube blank including rolling pressure applied over the area on both sides of the weld at the region where the edges come together, and exerting sufficient rolling pressure in the region of the weld to bend the tube to a circular contour and reduce the circumference of the tube below that of the tube blank.

2. The method of making welded tubing which comprises bending preheated skelp into a tube blank of generally oval cross-section with the seam at one end of the oval and with the edge portions of the blank converging but spaced apart, heating the separated edge faces to surface fusion by an oxyacetylene flame system projected directly against said faces as the tube blank travels past the flame system with continuous motion, gathering the edges together and into contact to make a weld by rolling pressure applied to the outer circumference of the tube blank including rolling pressure applied over the area on both sides of the weld at the region where the edges come together, protecting the edges of the tube blank by the envelope gases of the flame system until the edge faces come into actual contact, and exerting sufficient rolling pressure in the region of the weld to bend the tube to a circular contour and reduce the circumference of the tube below that of the tube blank.

3. In the manufacture of welded pipe and tubing by passing a skelp or tube blank progressively through a plurality of successive roll passes that form or hold the skelp or tube blank to a desired contour, and heating the spaced edges of the tube blank to a welding condition by projecting heating jets directly against the edge faces of the tube blank, the improvement which comprises projecting the heating jets directly against the separated edge faces not only during the travel of the tube blank between successive roll passes but also during the time that said tube blank is traveling through and beyond one or more of said roll passes.

4. The combination of a forming roll stand including rolls constituting a pass shaped to bend a skelp to a tube blank of generally oval contour with the lower portion of the tube blank of substantially the same curvature as the finished tube, and the upper portion of the tube blank with a greater radius of curvature and separated edge faces, guide means for the seam of the tube blank formed in the roll pass, said guide means being in position to maintain the seam at one end of the oval cross-section, a heating device in position to heat the edge portions of the tube as they pass beyond the forming roll stand, and a welding roll stand beyond the heating means including rolls constructed and arranged to simultaneously close the seam and bend the tube to substantially circular contour, one of said welding rolls extending across the seam and rolling the outside surface of the tube on both sides of the weld.

5. The combination of a forming roll stand including rolls constituting a pass shaped to bend a skelp to a tube blank of generally oval contour with separated edge faces, guide means for the seam of the tube blank formed in the roll pass, said guide means being in position to maintain the seam at one end of the oval cross-section, a heating device in position to heat the edge portions of the tube as they pass beyond the forming roll stand, and a welding roll stand beyond the heating means including rolls constructed and arranged to simultaneously close the seam and bend the tube to substantially circular contour, one of said welding rolls extending across the seam and rolling the outside surface of the tube on both sides of the weld.

JAMES L. ANDERSON.